US012522769B2

(12) United States Patent
Singh et al.

(10) Patent No.: US 12,522,769 B2
(45) Date of Patent: Jan. 13, 2026

(54) PROCESS TO PREPARE FEED BY USING DIVIDING WALL COLUMN AND/OR CONVENTIONAL COLUMN FOR CATALYTIC CRACKING UNIT TARGETING OLEFIN PRODUCTION

(71) Applicant: KELLOGG BROWN & ROOT LLC, Houston, TX (US)

(72) Inventors: Bhari Bhujan Singh, Slough (GB); Ian Charles Elgey, Slough (GB)

(73) Assignee: Kellogg Brown & Root LLC, Houston, TX (US)

( * ) Notice: Subject to any disclaimer, the term of this patent is extended or adjusted under 35 U.S.C. 154(b) by 175 days.

(21) Appl. No.: 17/126,193

(22) Filed: Dec. 18, 2020

(65) Prior Publication Data

US 2021/0189257 A1    Jun. 24, 2021

Related U.S. Application Data

(60) Provisional application No. 62/950,714, filed on Dec. 19, 2019.

(51) Int. Cl.
*C10G 11/00* (2006.01)
*B01D 3/14* (2006.01)
(Continued)

(52) U.S. Cl.
CPC ............. *C10G 11/18* (2013.01); *B01D 3/141* (2013.01); *B01D 3/143* (2013.01); *B01J 8/1827* (2013.01); *B01J 8/24* (2013.01); *C10G 69/04* (2013.01); *C10G 2300/1044* (2013.01); *C10G 2300/1059* (2013.01); *C10G 2300/107* (2013.01);
(Continued)

(58) Field of Classification Search
CPC ............... C10G 11/18; C10G 69/04; C10G 2300/4056; C10G 2300/1059; C10G 2300/107; C10G 2300/1044; C10G 2300/405; C10G 2300/4043; C10G 2400/02; C10G 2400/20; B01J 8/1827; B01J 8/24; B01D 3/141; B01D 3/143
See application file for complete search history.

(56) References Cited

U.S. PATENT DOCUMENTS

| | | | |
|---|---|---|---|
| 6,504,038 B1 * | 1/2003 | Van Der Sluis | ........ C07C 15/46 585/435 |
| 7,815,791 B2 | 10/2010 | Keusenkothen | |

(Continued)

FOREIGN PATENT DOCUMENTS

| | | |
|---|---|---|
| WO | 2012074691 A2 | 6/2012 |
| WO | 2017127288 A1 | 7/2017 |

OTHER PUBLICATIONS

International Search Report and Written Opinion for International Application No. PCT/US20/65821 filed Dec. 18, 2020 received from the International Searching Authority on Mar. 18, 2021 (21 pages).

(Continued)

*Primary Examiner* — Prem C Singh
*Assistant Examiner* — Brandi M Doyle
(74) *Attorney, Agent, or Firm* — Gary M. Machetta (57) ABSTRACT

A dividing wall column or a pair of conventional columns can be used to separate an unstabilized naphtha stream to produce an aromatics-free light naphtha stream as a feed for a catalytic cracking unit for olefins production.

6 Claims, 4 Drawing Sheets

(51) Int. Cl.
  *B01J 8/18* (2006.01)
  *B01J 8/24* (2006.01)
  *C10G 11/18* (2006.01)
  *C10G 69/04* (2006.01)

(52) U.S. Cl.
  CPC ............... *C10G 2300/4043* (2013.01); *C10G 2300/405* (2013.01); *C10G 2300/4056* (2013.01); *C10G 2400/02* (2013.01); *C10G 2400/20* (2013.01)

(56) References Cited

U.S. PATENT DOCUMENTS

| | | | |
|---|---|---|---|
| 9,458,394 | B2 | 10/2016 | Dean et al. |
| 9,512,047 | B2 | 12/2016 | Nyce et al. |
| 10,414,990 | B1 * | 9/2019 | Sachan .................. C10G 67/14 |
| 2007/0095725 | A1 | 5/2007 | Podrebarac et al. |
| 2008/0081937 | A1 | 4/2008 | Schulz et al. |
| 2011/0110825 | A1 | 5/2011 | Leonard et al. |
| 2011/0243797 | A1 | 10/2011 | da Silva Ferreira Alves et al. |
| 2014/0034551 | A1 * | 2/2014 | Freire .................. C10G 51/06 208/74 |

OTHER PUBLICATIONS

China National Intellectual Property Administration; Second Office Action dated Feb. 5, 2024 for China Patent Application No. 202080089899.2 filed Jun. 17, 2022, 8 pages.

European Patent Office, Communication Pursuant to Article 94(3) EPC dated Dec. 17, 2024 for European Patent Application No. 20902314.2 filed Jun. 24, 2022, 11 pages.

German Intellectual Property, Patents Act 1977 Examination Report under Section 18(3); dated Aug. 8, 2024 for German Application No. GB22090955 filed Jun. 21, 2022, 7 pages.

* cited by examiner

PROCESS TO PREPARE FEED BY USING DIVIDING WALL COLUMN AND/OR CONVENTIONAL COLUMN FOR CATALYTIC CRACKING UNIT TARGETING OLEFIN PRODUCTION

CROSS-REFERENCE TO RELATED APPLICATION

This application claims the benefit of U.S. Provisional Application Ser. No. 62/950,714 filed Dec. 19, 2019, incorporated herein by reference in its entirety.

TECHNICAL FIELD

The present invention relates to systems using catalytic cracking units for olefins production, and more particularly relates to such systems where a light naphtha feed is produced within the system.

BACKGROUND

Fluid catalytic cracking (FCC) is an important and well-known commercial conversion process used in petroleum refineries. It is widely used to convert high-boiling, high molecular weight hydrocarbon fractions of petroleum crude oils into more valuable gasoline, olefins, and other products. Cracking of petroleum hydrocarbons is now primarily done by catalytic cracking because it produces more gasoline with a higher octane rating than thermal cracking. It also produces byproduct gases that have more carbon-carbon double bonds, that is, more olefins, and hence more economic value than those produced by thermal cracking.

The breaking of the large hydrocarbon molecules into smaller molecules is technically referred to by organic chemists as "scission" of the carbon-to-*carbon bonds. Some of the smaller alkanes are then broken and converted into even smaller alkenes and branched alkenes such as the gases ethylene ($CH_2=CH_2$ or C2=), propylene ($CH_3-CH=CH_2$ or C3=), butylenes, and isobutylenes (collectively C4=). Those olefinic gases are valuable for use as petrochemical feedstocks. The propylene, butylene and isobutylene are also valuable feedstocks for certain petroleum refining processes that can convert them into high-octane gasoline blending components. They may also be used as valuable chemical building blocks for higher molecular products such as polymers.

It is always desirable to improve catalytic cracking systems by improving reliability, controlling fractionation quality inside the battery limit, steadily producing light olefins, improving fractionation efficiency, reducing utility requirements, reducing overall energy requirements, reducing $CO_2$/NOx emissions, reducing equipment footprint requirements, and/or improving the value of the products.

SUMMARY

There is provided, in one non-limiting embodiment, a catalytic cracking system configured for olefins production where the system comprises a reactor/regenerator, a main fractionator, and a vapor recovery unit (VRU). The reactor/regenerator is adapted to receive a feed comprising gas oils and/or deasphalted oil (DAO) and/or atmospheric residue in a first riser and an aromatics-free C5/C6-rich light naphtha feed in a second riser, the reactor/regenerator generating a high-value product stream comprising light and heavy paraffinic, naphthenic, aromatic and olefinic hydrocarbons. The main fractionator is configured for receiving and fractionating the high-value product stream, where the main fractionator includes a fractionator vapor product stream comprising fuel gas, C3/C4, and light naphtha; a wild naphtha product stream; and fractionator liquid products stream comprising optionally heavy naphtha, light cycle oil (LCO), and slurry. The VRU includes a primary absorber, where the VRU receives the fractionator vapor and wild naphtha product streams and separates them to give an aromatics-free C5/C6-rich product stream, where the aromatics-free C5/C6-rich product stream is directed as the aromatics-free C5/C6-rich light naphtha feed back to the reactor/regenerator. The VRU further includes two embodiments. In a first non-limiting embodiment the VRU includes a combination of a debutanizer column and a naphtha splitter column, and a debutanizer bottoms product that is split between a feed to the naphtha splitter column and recycle to the primary absorber, and where the naphtha splitter column splits out the aromatics-free C5/C6-rich product stream. In a second non-limiting embodiment the VRU comprises a dividing wall column (DWC) comprising a pre-fractionator section and a main-fractionator section where the DWC comprises a side draw that is the aromatics-free C5/C6-rich product stream, and the DWC comprises a bottoms product that is split between a gasoline product and recycle to the primary absorber.

There is additionally provided method for producing olefins in a catalytic cracking system, where the method includes directing a feed to a reactor/regenerator, where the feed comprising at least one component selected from the group consisting of gas oils, deasphalted oil (DAO), atmospheric residue, and an aromatics-free C5/C6-rich light naphtha feed. The method further includes the reactor/regenerator generating a high-value product stream comprising light and heavy paraffinic hydrocarbons, naphthenic, aromatics and olefinic hydrocarbons. The method additionally includes directing the high-value product stream to a main fractionator where main fractionator fractionates the high-value product stream and generates a fractionator vapor product stream comprising fuel gas, C3/C4, and light naphtha, a wild naphtha product stream, and a fractionator liquid products stream comprising at least one component selected from the group consisting of heavy naphtha, light cycle oil (LCO), and slurry. The method also includes directing fractionator vapor and wild naphtha product streams to a vapor recovery unit (VRU) comprising a primary absorber where the VRU separates the fractionator vapor and wild naphtha product streams to give an aromatics-free C5/C6-rich product stream. The aromatics-free C5/C6-rich product stream is directed to the reactor/regenerator as an aromatics-free C5/C6-rich light naphtha feed recycle. The VRU further comprises units of either of the two embodiments described above.

DETAILED DESCRIPTION

Existing FCC units can be revamped or a new grassroots FCC unit can be designed with improved technology, including but not necessarily limited to MAXOFIN™ technology available from KBR to produce light olefins such as ethylene and propylene from a light naphtha stream. MAXOFIN™ technology is a process that enables refiners to maximize propylene production by 20% or more with significantly less ethylene than traditional steam cracking, and it provides the flexibility to operate as a conventional FCC system to produce gasoline depending on changing market demands.

The KBR MAXOFIN™ technology employs dual risers. The first riser processes the conventional FCC feed-stocks (gas oils, DAO and atmospheric residue) and in the second riser light paraffinic, naphthenic, or olefinic hydrocarbons are cracked to achieve the desirable high yields of the light olefins. The reactor effluent from both the risers in the MAXOFIN™ unit is fractionated in a main fractionator column.

The light naphtha feed, suitable to produce the light olefins by cracking in the second riser is conventionally imported from the outside battery limit (OSBL). It has been discovered that the light naphtha feed can be produced internally in the MAXOFIN™ unit.

Figure 1:
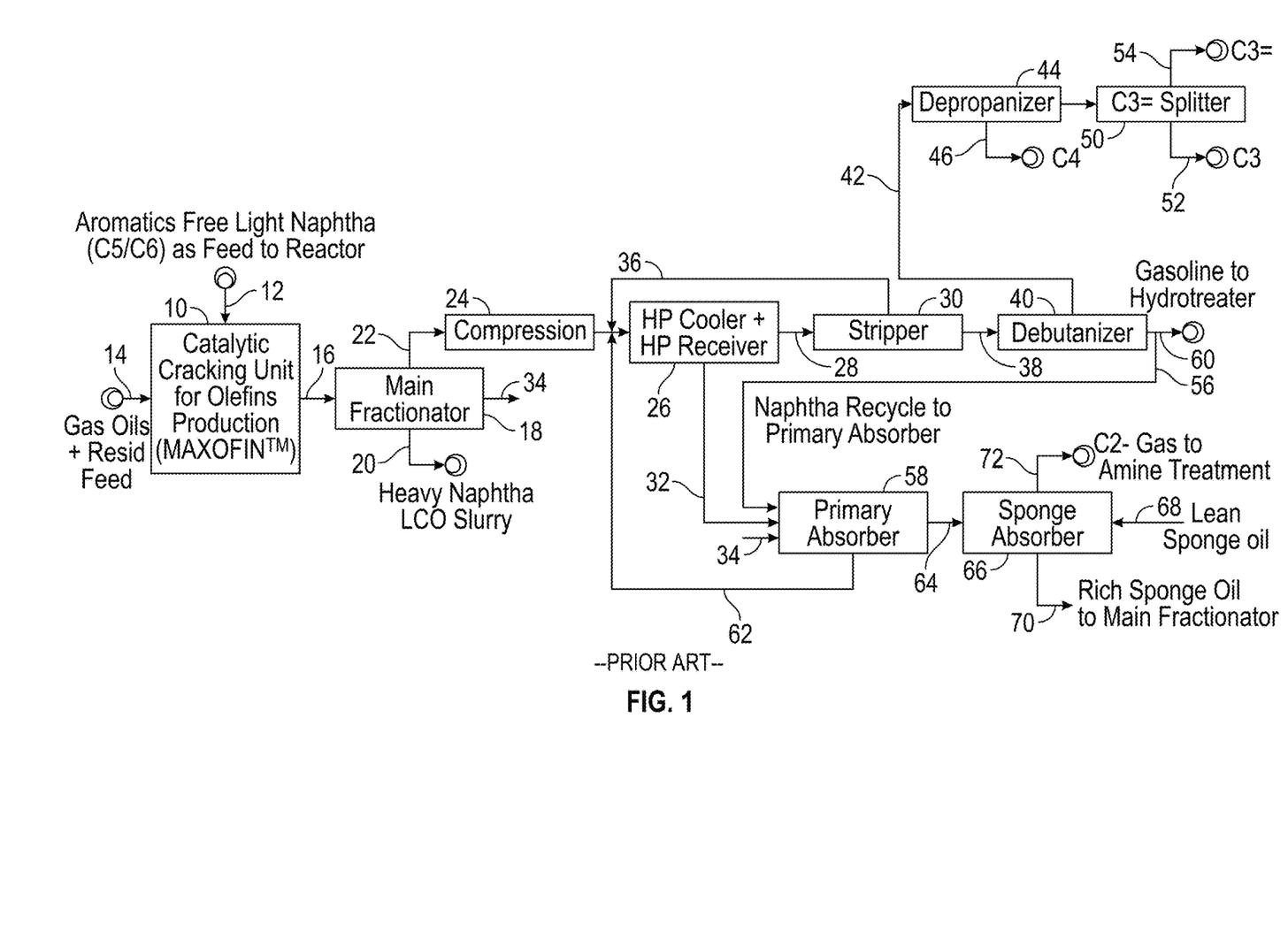
FIG. 1 is a non-limiting, schematic illustration of a typical FCC and gas plant block flow diagram illustrating imported naphtha feed for olefins production as described herein.

A FCC unit consists of three main sections, the reactor/regenerator 10, the main fractionator 18, and the unsaturated gas plant section (also known as the vapor recovery unit (VRU) or gas concentration unit (GCU)). FIG. 1 shows all three sections. The VRU comprises wet gas compressor 24, high pressure (HP) cooler/high pressure receiver 26, primary absorber 58, sponge absorber 66, stripper 30, debutanizer (stabilizer) 40, depropanizer 44, and C3=splitter 50.

A typical MAXOFIN™ unit block flow diagram when the light naphtha stream 12 is imported as a second riser feed from the outside battery limit is shown in FIG. 1 to the reactor/regenerator 10. There is also a gas oils, DAO and resid feed 14 from OSBL to a first riser of the reactor/regenerator 10. First riser and second riser are conventional components of the catalytic cracking unit 10 and are not separately shown in the Figures but are understood to be present.

FCC feed (heavy atmospheric gas oils, vacuum gas oils, DAO, and/or residue) 14 is cracked into high-value products 16 in the reactor/regenerator 10 and routed to the main fractionator section 18. The liquid product 20 from the main fractionator 18 includes heavy naphtha, light cycle oil (LCO), and slurry. Only slurry is a bottoms product; the heavy naphtha and LCO are side products.

The overhead products 22 from the main fractionator 18 mainly contain fuel gas (C2- and inert), liquefied petroleum gas (LPG; C3/C4), and cat-cracked naphtha are further separated in the gas plant section (VRU). Wet gas 22 from the main fractionator 18 overhead flows to the wet gas compressor 24; this is usually a two-stage centrifugal machine. The vapors from the first stage discharge are partially condensed in an interstage cooler and flashed in an interstage drum. The vapor discharge from the second stage of the wet gas compressor 24 is combined with the liquid from the compressor interstage drum, the primary absorber bottoms liquid 62, and the stripper overhead vapors 36. This combined stream flows through the high pressure (HP) cooler into the high pressure (HP) receiver, collectively designated 26.

Vapor 32 from the HP separator drum flows to the primary absorber column 58. Hydrocarbon liquid (wild naphtha) 34 from the main fractionator 18 overhead drum is pumped to the primary absorber 58 as a lean oil. The debutanizer 40 bottoms liquid 56 is also pumped to the primary absorber 58 to increase the lean oil flow, and therefore the propylene recovery. The debutanizer bottoms liquid 56 enters the primary absorber 58 at a higher point than the wild naphtha 34. LPG (C3/C4) 62 recuperated in the primary absorber 58 bottoms is directed to the HP cooler/HP receiver 26. The primary absorber overhead gas 64 flows to the secondary or sponge absorber 66 to recover the LPG range material by absorption into a lean sponge oil 68. Rich sponge oil 70 is routed to main fractionator 18. The sponge absorber overhead 72 (C2—) flows to treating and is then routed to the refinery fuel gas system.

Liquid 28 from the HP separator drum 26 is pumped to the top of the stripper column 30. The purpose of stripper column 30 is to achieve a C2 content specification in the feed 38 to the debutanizer (stabilizer) 40. Stripped vapor 36 containing most of the C2— and some LPG leaves the top of the stripper column 30 and is returned to the HP cooler/HP receiver 26. The stripper bottoms liquid 38 is preheated by heat exchange with the debutanizer bottoms liquid and fed to the debutanizer column 40.

The debutanizer column 40 separates the feed into LPG 42 and cat-cracked naphtha (combined streams 56 and 60). The overhead product 42 from the debutanizer 40 is LPG (C3/C4). Bottoms liquid (combined streams 56 and 60) from the debutanizer 40 is cooled against the column feed and then by air and/or a water cooler (not shown). A portion of the cooled debutanizer bottoms liquid 56 is returned to the primary absorber 58 as a super lean oil and the remainder 60 is yielded as a cat-cracked naphtha gasoline blendstock. The LPG 42 from the overhead of the debutanizer after amine and mercaptan removal treatment flows to a depropanizer 44 where it is separated into C3 and C4 products. The C3 product 48 may be further separated into propylene (C3=) 54 product and propane (C3) product 52 in a propylene splitter 50 downstream of the depropanizer column 44. The C4 bottoms product 46 from depropanizer 44 is sent to OSBL.

Figure 2:
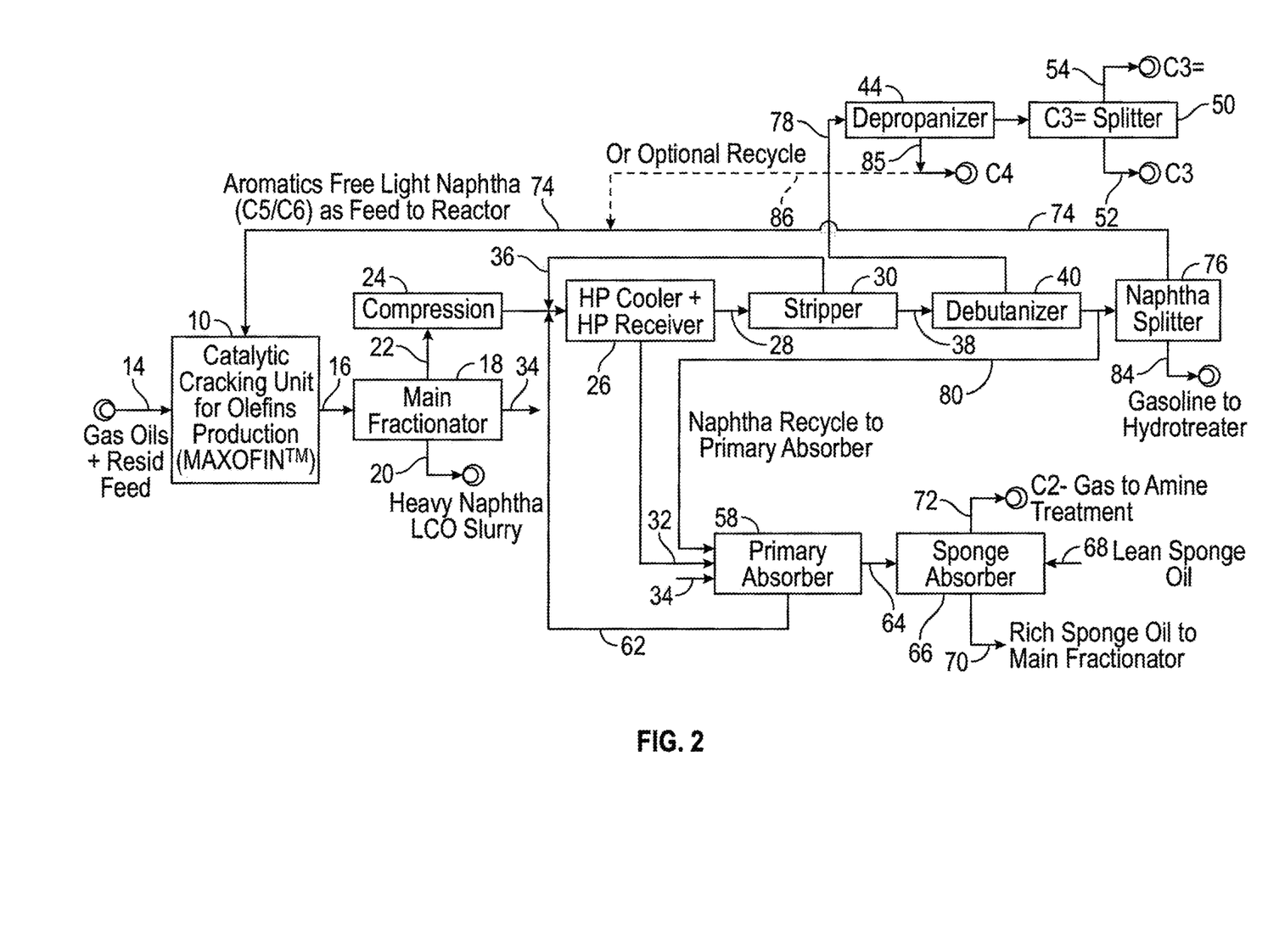
FIG. 2 is a non-limiting, schematic illustration of a FCC and gas plant block flow diagram illustrating internal naphtha feed generation for olefins production using two columns as described herein.

It has been discovered that the light naphtha stream 74 can be produced inside the battery limit as the second riser feed to reactor/regenerator 10, which is a configuration that increases olefinic LPG yield. FIG. 2 presents a nonlimiting, schematic illustration of a reactor/regenerator 10, main fractionator 18 and gas plant. The system and method herein relate to an unsaturated gas plant section, also called a VRU or GCU. In one non-limiting embodiment the VRU comprises two conventional columns but in a unique series—namely the debutanizer 40 and a naphtha splitter 76. The debutanizer 40 and a naphtha splitter 76 can be used to fractionate the stripper bottoms liquid 38 into three product streams: a LPG C3/C4 product is taken from the debutanizer overhead 78 and a stabilized naphtha stream from the debutanizer bottoms is partly recycled back to the primary absorber 58 as stream 80 and the balance 82 is further fractionated in the naphtha splitter 76 to produce an aromatics-free light naphtha (C5/C6) product 74 from the splitter overhead and the gasoline range material 84 from the splitter bottoms. The overhead product from the naphtha splitter 76 is an aromatics free C5/C6 rich stream 74 which is suitable to be recycled to the reactor/regenerator 10 as a second riser feed. The bottoms product 84 from the naphtha splitter 76 is routed for further treatment to make it suitable for the gasoline blending. In this non-limiting embodiment, a portion of the C4 bottoms product 85 from depropanizer 44 may be directed as an optional recycle stream 86 to the aromatics-free light naphtha (C5/C6) product 74 feed to reactor/regenerator 10. Other units and streams common to the prior art configuration of FIG. 1 have like reference numerals.

Figure 3:
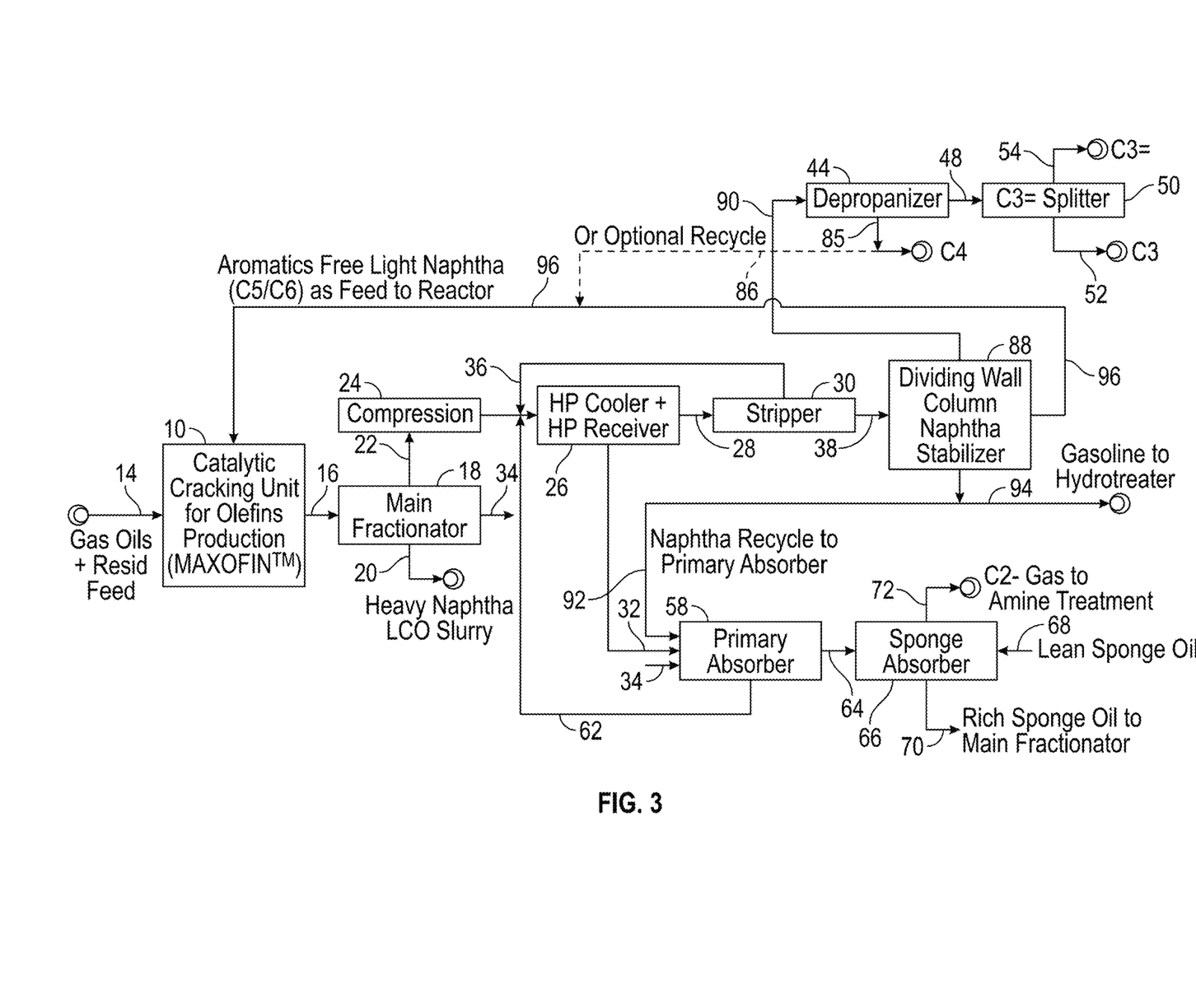
FIG. 3 is a non-limiting, schematic illustration of a FCC and gas plant block flow diagram illustrating internal naphtha feed generation for olefins production using a dividing wall column (DWC) as described herein.
Figure 4:
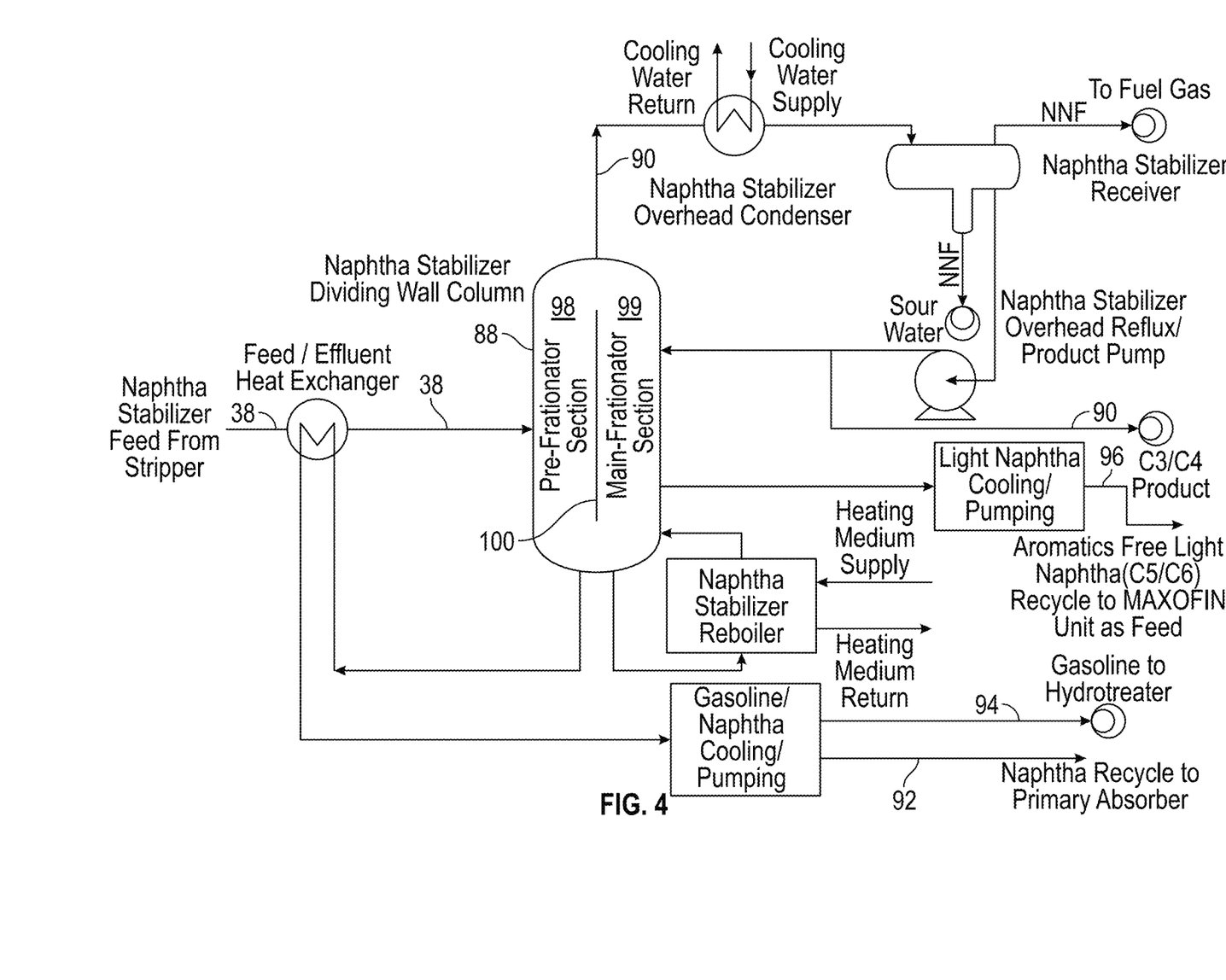
FIG. 4 is a non-limiting, schematic illustration of a more detailed view of the naphtha stabilizer DWC of the FIG. 3 system.

In a different non-limiting embodiment, the VRU comprises Dividing Wall Column (DWC) technology which can be used to further improve and simplify the process flow scheme (as shown schematically in FIG. 3) for olefins productions by the catalytic cracking unit. Dividing Wall Column technology delivers the performance of two conventional columns in series in a single column with reduced energy and capital requirement. Dividing Wall Column technology can be used to design a single column to replace the two columns in series system as shown in the FIG. 2 embodiment. As presented In FIG. 3 and FIG. 4 a Dividing Wall Column (DWC) 88 is used to fractionate the stripper bottoms liquid 38 from the stripper 30 into three products:

A LPG C3/C4 product 90 is taken from the DWC overhead.

An aromatics-free light naphtha stream 96 taken from the main-fractionator side of the DWC 88 is concentrated with the C5/C6 components 96 and routed to the second riser of the reactor/regenerator 10 for olefins production.

The bottoms product from the DWC 88 is divided into naphtha recycle 92 back to the primary absorber 58, where the balance 94 is routed for further treatment to make it suitable for the gasoline blending.

Again, the same units and streams have the same reference numbers as used in discussions of the previous Figures.

FIG. 4 is a more detailed view of the naphtha stabilizer DWC 88 shown in the FIG. 3 system. DWC 88 comprises a pre-fractionator section 98 and a main-fractionator section 99 divided by dividing wall 100.

It will be appreciated that the DWC can be a tray column, a packed column, or a combination of both.

It will also be appreciated that the systems and processes described herein will have a number of technical and commercial advantages.

For the non-limiting embodiment where two conventional columns are used for the debutanizer and naphtha splitter as schematically illustrated in FIG. 2, technical advantages include, but are not necessarily limited to:

Improved reliability as compared to the light naphtha imported from outside the battery limit; and Control on fractionation quality inside the battery limit.

Commercial advantages for this non-limiting embodiment include, but are not necessarily limited to steady production of the light olefins.

For the non-limiting embodiment where a DWC is used as schematically illustrated in FIGS. 3 and 4, technical advantages include, but are not necessarily limited to:

Improvement on fractionation efficiency;

Improvement on primary absorber performance;

Reduced utility requirements;

Reduced overall energy requirements;

Reduced $CO_2$/NOx emissions;

Opportunity to revamp existing column to get an additional product suitable for the light olefins production; and Enhanced plant safety due to less hydrocarbon inventory.

Commercial advantages for the non-limiting embodiment where a DWC is used include, but are not necessarily limited to, the commercial advantage noted above for when two conventional columns are used, in addition to:

20-30% less capital requirement as compared to the conventional column solution;

Improvement in fractionation economics;

Less plot space (footprint) requirement;

Offers advantages for plant upgrading/debottlenecking;

Overall improvement in the value of products; and

Alternative use of existing assets to improve the overall economics of the plant.

Stated another way, a non-limiting improvement in the FIG. 2 embodiment over the FIG. 1 conventional column system involves introducing a two-product naphtha splitter column downstream of a debutanizer column to produce an aromatics-free light naphtha as distillate which is recycled back for light olefins production and gasoline stream as a bottoms product.

Improvements in the non-limiting embodiment of FIGS. 3 and 4 over the FIG. 2 embodiment include using a DWC to match the separation requirement of a debutanizer column and a two-product conventional naphtha splitter column. A DWC is producing LPG as a top product, light naphtha as a side product and gasoline stream as a bottoms product. The application of DWC offers capital expenditure (CAPEX) benefits (less equipment count and plot space benefits) and operational expenditure (OPEX) benefits (lower energy requirement) as compared to the route shown in FIG. 2.

Furthermore, there are many noticeable differences between a fractionation approach such as Honeywell UOP U.S. Patent Application Publication 2008/0081937 A1 and the proposed system described herein including, but not necessarily limited to, those listed in Table I below:

TABLE I

Differences Between Proposed System and '937 Application

| | '937 Application | Proposed System |
|---|---|---|
| Feed to DWC | Stabilized Naphtha (C5 to C9+ hydrocarbons) | Unstabilized Naphtha (C3 to C9+ hydrocarbons) |
| DWC Operating pressure | 5-15 psig (0.034-0.103 MPag) | About 140 psig (0.965 MPag) |
| Top product (Distillate) | C5-C6 range feed for light olefins production A Total Boiling Point (TBP) at the 95% cut point in the range of about 162° F. to about 172° F. (about 72° C. to 78° C.) | C3-C4 range |
| Middle product | C7-C8 range | Aromatics free C5-C6 range feed for light olefins |

TABLE I-continued

Differences Between Proposed System and '937 Application

| | '937 Application | Proposed System |
|---|---|---|
| | | production Theoretical true final boiling point at about 174° F. (79° C.) |
| Bottoms product | C8+ | Gasoline (Benzene, C7+) |
| The light olefins reactor feed | Routed to light fraction compound cracking zone 283 and products (288 and 259) shown separately from light fraction compound cracking zone 283 | Recycled back to the equivalent of fluidized reactor zone "214" and product from the second riser is mixed with the products of the first riser before they are routed to the main fractionator |

In the foregoing specification, the invention has been described with reference to specific embodiments thereof. However, the specification is to be regarded in an illustrative rather than a restrictive sense. For example, equipment, columns, DWCs, processes, reactants, olefins, products, reactors, regenerators, splitters, stabilizers, absorbers, compressors, coolers, and operating conditions falling within the claimed or disclosed parameters, but not specifically identified or tried in a particular example, are expected to be within the scope of this invention.

The present invention may be practiced in the absence of an element not disclosed. In addition, the present invention may suitably comprise, consist or consist essentially of the elements disclosed. For instance, there may be provided a catalytic cracking system configured for olefins production where the system consists essentially of or consists of a reactor/regenerator, a main fractionator, and a VRU, where the reactor/regenerator is adapted to receive a feed comprising gas oils and/or DAO and/or atmospheric residue and an aromatics-free C5/C6-rich light naphtha feed, the reactor/regenerator comprising a high-value product stream comprising light and heavy paraffinic hydrocarbons, naphthenic, aromatics and olefinic hydrocarbons; the main fractionator is configured to receive and fractionate the high-value product stream, where the main fractionator comprises a fractionator vapor product stream comprising fuel gas, C3/C4, and light naphtha, a wild naphtha stream, and a fractionator liquid products stream comprising heavy naphtha, LCO, and slurry; and the VRU comprises a primary absorber, the VRU receiving the fractionator vapor and wild naphtha product streams and separating them to give an aromatics-free C5/C6-rich product stream, where the aromatics-free C5/C6-rich product stream is directed as the aromatics-free C5/C6-rich light naphtha feed recycle to the reactor/regenerator; the VRU further comprises units selected from the group consisting of 1) a combination of a debutanizer column and a naphtha splitter column or 2) a DWC, where a debutanizer bottoms product is split between a feed to the naphtha splitter column and feed to the primary absorber, and the naphtha splitter column splits out the aromatics-free C5/C6-rich product stream; and where if the DWC is used, it comprises a pre-fractionator section and a main fractionator section where the DWC comprises a side draw that is the aromatics-free C5/C6-rich product stream and the DWC comprises a bottoms product feed to the primary absorber.

The words "comprising" and "comprises" as used throughout the claims, are to be interpreted to mean "including but not limited to" and "includes but not limited to", respectively.

As used herein, the word "substantially" shall mean "being largely but not wholly that which is specified."

As used herein, the singular forms "a," "an," and "the" are intended to include the plural forms as well, unless the context clearly indicates otherwise.

As used herein, the term "about" in reference to a given parameter is inclusive of the stated value and has the meaning dictated by the context (e.g., it includes the degree of error associated with measurement of the given parameter).

As used herein, the term "and/or" includes any and all combinations of one or more of the associated listed items.

What is claimed is:

1. A catalytic cracking system configured for olefins production where the system comprises:
    a reactor/regenerator adapted to receive a feed comprising at least one component selected from the group consisting of gas oils, deasphalted oil (DAO), atmospheric residue, and an aromatics-free C5/C6-rich light naphtha feed, the reactor/regenerator comprising a high-value product stream comprising light and heavy paraffinic hydrocarbons, naphthenic, aromatics and olefinic hydrocarbons;
    a main fractionator configured to receive and fractionate the high-value product stream, and to produce product streams comprising:
        a fractionator vapor product stream comprising fuel gas, C3/C4, and light naphtha;
        a wild naphtha product stream comprising C3/C4 and naphtha; and
        a fractionator liquid products stream comprising at least one component selected from the group consisting of heavy naphtha, light cycle oil (LCO), and slurry; and
    a vapor recovery unit (VRU) comprising a wet gas compressor, a primary absorber, a stripper, a sponge absorber, and a dividing wall column (DWC), wherein the VRU is configured to receive the fractionator vapor product stream and wild naphtha product streams and to separate them to give an aromatics-free C5/C6-rich product stream, where the aromatics-free C5/C6-rich product stream is directed as an aromatics-free C5/C6-rich light naphtha feed recycle to the reactor/regenerator,
    wherein the DWC is configured to receive bottoms liquid directly from the stripper and comprises:
        a pre-fractionator section;
        a main fractionator section;
        a side draw that is the aromatics-free C5/C6-rich product stream;

a bottoms product stream that is split between a heavy naphtha product and a feed to the primary absorber; and a top product stream comprising C3/C4.

2. The catalytic cracking system of claim 1, wherein the bottoms product stream comprises a cat-cracked naphtha gasoline blendstock.

3. The catalytic cracking system of claim 1, wherein the top product stream of the DWC is directed to a depropanizer, and the depropanizer comprises a C3 effluent product stream.

4. A catalytic cracking system configured for olefins production where the system comprises:
- a reactor/regenerator adapted to receive a feed comprising at least one component selected from the group consisting of gas oils, deasphalted oil (DAO), atmospheric residue, and an aromatics-free C5/C6-rich light naphtha feed, the reactor/regenerator comprising a high-value product stream comprising light and heavy paraffinic hydrocarbons, naphthenic, aromatics and olefinic hydrocarbons;
- a main fractionator configured to receive and fractionate the high-value product stream, the main fractionator configured to produce product streams comprising:
  - a fractionator vapor product stream comprising fuel gas, C3/C4, and light naphtha;
  - a wild naphtha product stream comprising C3/C4 and naphtha; and
  - a fractionator liquid products stream comprising at least one component selected from the group consisting of heavy naphtha, light cycle oil (LCO), and slurry; and
- a vapor recovery unit (VRU) comprising a wet gas compressor, a primary absorber, a stripper, a sponge absorber, and a dividing wall column (DWC), wherein the VRU is configured to receive the fractionator vapor product stream and wild naphtha product streams and separate them to give an aromatics-free C5/C6-rich product stream, where the aromatics-free C5/C6-rich product stream is directed as an aromatics-free C5/C6-rich light naphtha feed recycle to the reactor/regenerator, wherein the DWC is configured to receive bottoms liquid directly from the stripper and comprises:
- a pre-fractionator section;
- a main fractionator section;
- a side draw that is the aromatics-free C5/C6-rich product stream;
- a bottoms product stream comprising a cat cracked naphata gasoline blendstock, the bottoms product stream being split between a heavy naphtha product and a feed to the primary absorber; and
- a top product stream comprising C3/C4.

5. A catalytic cracking system configured for olefins production where the system comprises:
- a reactor/regenerator adapted to receive a feed comprising at least one component selected from the group consisting of gas oils, deasphalted oil (DAO), atmospheric residue, and an aromatics-free C5/C6-rich light naphtha feed, the reactor/regenerator comprising a high-value product stream comprising light and heavy paraffinic hydrocarbons, naphthenic, aromatics and olefinic hydrocarbons;
- a main fractionator configured to receive and fractionate the high-value product stream, the main fractionator configured to produce product streams comprising:
  - a fractionator vapor product stream comprising fuel gas, C3/C4, and light naphtha;
  - a wild naphtha product stream comprising C3/C4 and naphtha; and
  - a fractionator liquid products stream comprising at least one component selected from the group consisting of heavy naphtha, light cycle oil (LCO), and slurry; and
- a vapor recovery unit (VRU) comprising a wet gas compressor, a primary absorber, a stripper, a sponge absorber, and a dividing wall column (DWC), wherein the VRU is configured to receive the fractionator vapor product stream and wild naphtha product streams and separate them to give an aromatics-free C5/C6-rich product stream, where the aromatics-free C5/C6-rich product stream is directed as an aromatics-free C5/C6-rich light naphtha feed recycle to the reactor/regenerator, wherein the DWC is configured to receive bottoms liquid directly from the stripper and comprises:
- a pre-fractionator section;
- a main fractionator section;
- a side draw that is the aromatics-free C5/C6-rich product stream;
- a bottoms product stream that is split between a heavy naphtha product and feed to the primary absorber; and
- a top product stream comprising C3/C4 directed to a depropanizer.

6. The catalytic cracking system of claim 5 wherein the depropanizer comprises a C3 effluent product stream.

* * * * *